United States Patent [19]

Uesugi et al.

[11] Patent Number: 4,881,126
[45] Date of Patent: Nov. 14, 1989

[54] IMAGE COMPOSING APPARATUS

[75] Inventors: Mitsuaki Uesugi; Masaichi Inomata; Isamu Komine, all of Kanagawa, Japan

[73] Assignee: NKK Corporation, Tokyo, Japan

[21] Appl. No.: 258,604

[22] Filed: Oct. 17, 1988

[30] Foreign Application Priority Data

Mar. 31, 1988 [JP] Japan .................................. 63-76392

[51] Int. Cl.$^4$ .............................................. H04N 5/14
[52] U.S. Cl. .................................... 358/160; 358/183
[58] Field of Search ................. 358/22, 105, 160, 181, 358/183

[56] References Cited

U.S. PATENT DOCUMENTS 4,168,510  9/1979  Kaiser .................................. 358/183
4,713,686 12/1987  Ozaki et al. ......................... 358/105
4,713,693 12/1987  Southworth et al. ............... 358/160

Primary Examiner—John W. Shepperd
Assistant Examiner—Michael D. Parker
Attorney, Agent, or Firm—Michael N. Meller

[57] ABSTRACT

An image composing apparatus adapted to produce a composite image in which a value of each of picture elements is represented by a maximum value or minimum value of the brightness of a video signal as well as a corresponding other signal at the instant of the maximum or minimum value. A composite image is formed in which a value of each of picture elements is represented by a count of synchronizing signals or an externally applied timing, position or angle indicative external input signal at an instant that the video signal attains the maximum value or the minimum value for each picture element.

7 Claims, 6 Drawing Sheets

IMAGE COMPOSING APPARATUS

BACKGROUND OF THE INVENTION

The present invention relates to an image composing apparatus applicable to the tracing of a bright spot within an image, the measurement of a three-dimensional curved surface shape, etc.

Included among the presently commercially available digital frame memories for image storage purposes are those having a variety of image preliminarily processing functions. One of such image preliminary processing functions is a maximum brightness image processing function or minimum brightness image processing function.

Here, the maximum brightness image processing function (or the minimum brightness image processing function) is such that using for example a circuit as shown in FIG. 1, the video signal inputted from a television camera is compared with the image stored in a frame memory so as to determine in a realtime manner the relative magnitude of the corresponding picture elements to successively update the frame memory by the greater values (or the smaller values), thereby producing a composite image in which each of the picture elements has its maximum value (or its minimum value) within a given time period of the video signal. It is to be noted that FIG. 1 of the accompanying drawings shows an example of the maximum brightness image processing circuit and the description of its details will be omitted since the substantial description will be given in connection with the later description of an embodiment of the invention.

FIG. 2 shows an example in which the locus of a bright spot 30 is determined by the use of the maximum brightness image processing function, that is, the locus of the bright spot 30 moving within an image is determined by a maximum brightness image processing circuit 3 and displayed on a monitor television 20.

On the other hand, FIGS. 3 and 4 show another example which utilizes the minimum brightness image processing function to obtain a virtual cutting image. As shown in FIG. 3, a low-magnification microscope 31 is connected to a television camera 2 and a stroboscope light source 32 is arranged opposite to the microscope 31 through a rotary tool 33 to form a silhouette image of the rotary tool 33 on a monitor television 20. Then, if, in this case, the video signal is processed by a minimum brightness image processing circuit 3a as shown in FIG. 4, a virtual cutting surface image 34 of the cutting tool edges is obtained and the virtual cutting surface of the cutting edges of the rotary tool 33 moving across the silhouette image can he observed.

As described hereinabove, each of the maximum brightness image processing function and the minimum brightness image processing function is a convenient function as image composing means for image preliminary processing purposes.

However, in the tracing of the bright spot 30 shown in FIG. 2, for example, while the locus of the spot 30 can be observed, it is impossible to measure the speeds of the spot at various points on the locus from the maximum brightness image obtained by the maximum brightness image processing function. Similarly, it is impossible to know the times of passage of the cutting edges on the virtual cutting surface image of the cutting edges of the rotary tool 33 shown in FIGS. 3 and 4.

These deficiencies are due to the fact that the maximum brightness image processing function or the minimum brightness image processing function merely serves a function of simply storing brightness information for each picture element.

SUMMARY OF THE INVENTION

It is an object of the present invention to provide an image composing apparatus which overcomes the foregoing deficiencies in the prior art by producing a composite image in which the value of each picture element is represented by not only the maximum value or the minimum value of the brightness of a video signal but also any other corresponding signal at the instant that the former is attained.

An image composing apparatus according to the invention is designed so that instead of producing a composite image simply composed of the maximum value or the minimum value for each of the picture elements of a video signal, a composite image is produced in which the value of each of the picture element is represented by the count of synchronizing signals or an external input signal such as an externally inputted timing, position or angle indicative signal at the instant that each of the picture elements of a video signal attains the maximum value or the minimum value.

Thus, in accordance with the invention, if, for example, the invention is applied to the tracing of the light spot shown in FIG. 2 and timing signals are inputted as external input signals, an image is formed in which the value of each of the picture elements is represented by the time instant at which the corresponding point on the locus of the light spot attains the maximum brightness, thus permitting to know the time instant at which the light spot passed through each of the points on the locus and also to know the speed of the light spot at each point. In addition, the tracing of the cutting edges of the rotary tool shown in FIGS. 3 and 4 results in an image in which the value of each picture element is represented by the time of passage of the corresponding cutting edge.

Thus, in accordance with the invention, by virtue of the fact that not only a maximum brightness image or minimum brightness image is formed which is composed of the maximum value or the minimum value of each of the picture elements of a video signal but also a composite image is formed by coding the signal indicating the time, position, angle or the like at the instant that the maximum value or the minimum value is attained by each picture element, the invention makes it possible to develop new fields of information processing system such as making it possible to determine the speeds of the light spot during the tracing of the light spot as mentioned previously, making it possible to construct a three dimensional shape measuring apparatus which can be utilized more conveniently.

DESCRIPTION OF THE PREFERRED EMBODIMENTS

Figure 5:
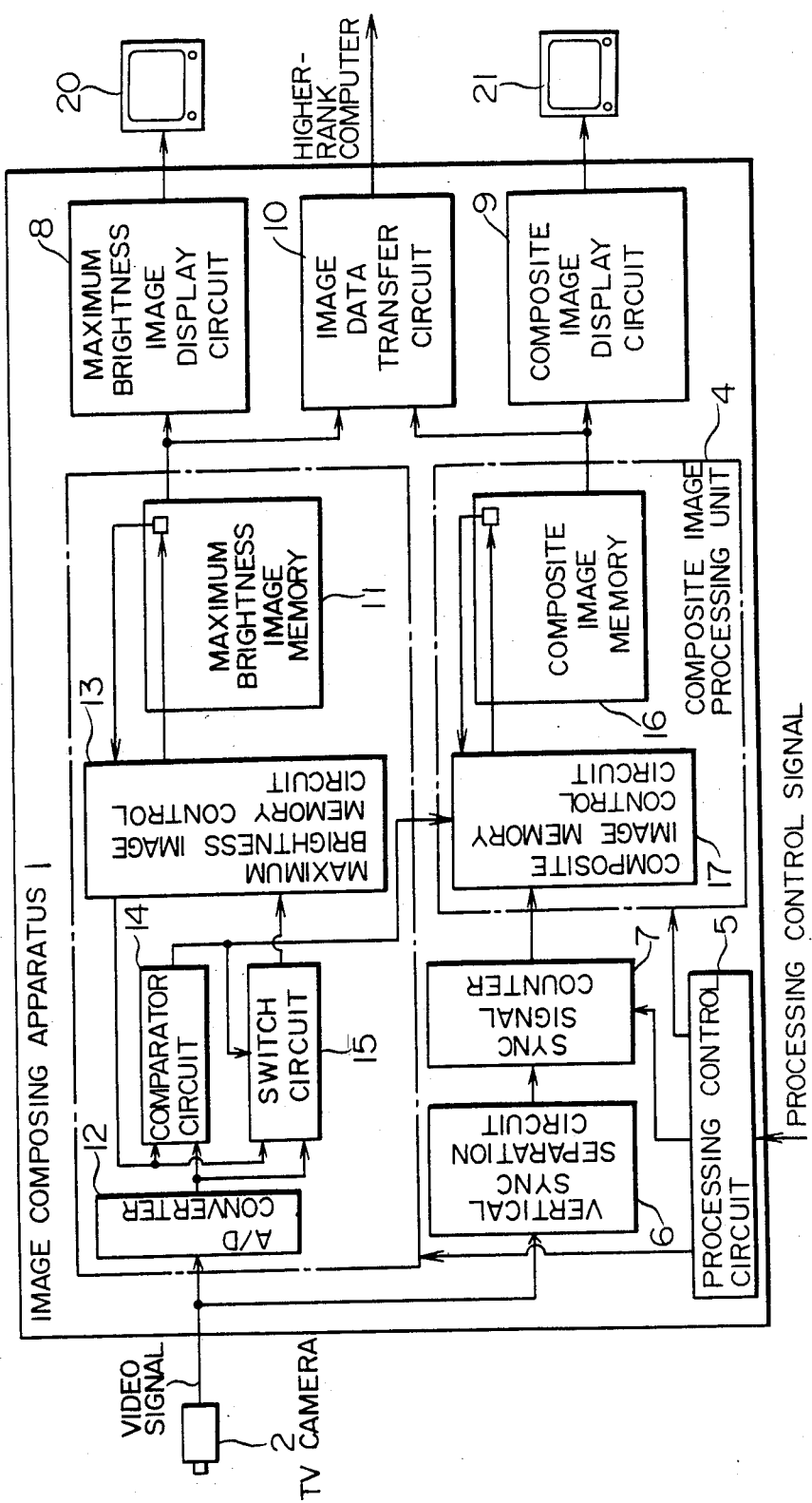
FIG. 5 is a block diagram showing the construction of an image composing apparatus according to an embodiment of the invention.

FIG. 5 is a block diagram showing the construction of an image composing apparatus according to an embodiment of the invention. This embodiment shows an image composing apparatus in which the value of each picture element is represented by the count of synchronizing signals at the timing of each picture element of a video signal attaining the maximum value within a given period of time.

The image composing circuit 1 includes mainly a maximum brightness image processing unit 3 for processing the video signal applied from a television camera 2 to form a composite image in which the value of each of the picture elements is represented by the video signal level at the instant that the video signal attains the maximum value for that picture element, and a composite image processing unit 4 for forming a composite image in which the value of each of the picture elements is represented by the count of synchronizing signals at the instant the video signal attains the maximum value with respect to that picture element.

Also, provided additionally to the processing units 3 and 4 are a processing control circuit 5 responsive to an externally applied processing control signal to control the image processing, a vertical sync separation circuit 6 and a synchronizing signal counter circuit 7 for separating the vertical synchronizing signals from the video signal and counting the separated signals or frequency divided signals thereof, a maximum brightness image display circuit 8 and a composite image display circuit 9 for respectively displaying the processed maximum brightness image and composite image on monitor televisions, and an image data transfer circuit 10 for transferring these images to a higher-rank computer.

The maximum brightness image processing unit 3 includes mainly a maximum brightness image memory 11 composed of a buffer memory for the maximum brightness image processing unit as well as an A/D converter circuit 12 for digitizing the video signal picture element by picture element, a maximum brightness image memory control circuit 13 for controlling the reading of data and the writing of processing results into the addresses corresponding to the picture elements of the video signal in the maximum brightness image memory 11, a comparator circuit 14 for comparing the signal level of the video signal applied from the television camera 2 with the value of the picture element at each corresponding address of the image in the maximum brightness image memory 11 to select and output greater one of the two values through a switch circuit 15. The timing of these operations is controlled by the processing control circuit 5.

On the other hand, the composite image processing unit 4 includes mainly a composite image memory 16 for storing the results of a composite image processing as well as a composite image memory control circuit 17 responsive to the output signal from the comparator circuit 14 of the maximum brightness image processing unit 3 so that when the signal level of the video signal applied from the television camera 2 is greater than the value of the corresponding picture element in the maximum brightness image memory 11 the synchronizing signal count generated from the synchronizing signal counter circuit 7 is written into the composite image memory 16.

This image composing apparatus 1 starts its operation at the timing of beginning of the processing in response to the control signal from the processing control circuit 5 with the maximum brightness image memory 11, the composite image memory 16 and the synchronizing signal counter circuit 7 being cleared to zero. Then, the video signal applied from the television camera 2 is digitized by means of the A/D converter circuit 12 so that the signal level of the video signal is compared with the value of the picture element in the maximum brightness image memory 11 which corresponds to the position of the picture element of the video signal. When the value of the video signal is greater, the switch circuit 15 is closed so that the video signal is delivered to the maximum brightness image memory 11 through the maximum brightness image momory control circuit 13 and the value of the corresponding picture element in the maximum brightness image memory 11 is updated with the signal level value of the video signal.

On the other hand, when the comparison between the video signal level and the value of the corresponding picture element in the maximum brightness image memory 11 determines that the video signal is greater, the comparator circuit 14 also delivers its output signal to the composite image memory control circuit 17. When the output signal of the comparator circuit 14 is applied, the composite image memory control circuit 17 writes the then current output of the synchronizing signal counter circuit 7 or the synchronizing signal count into the corresponding picture element of the composite image memory 16.

In this way, during the time that the external processing control signal is applied, the above-mentioned processing is performed so that upon the completion of the processing the maximum brightness signals are written into the maximum brightness image memory 11 and the synchronizing signal counts obtained at the instants that the maximum brightness was attained are written into the composite image memory 16 thereby respectively forming a maximum brightness image and a composite image.

The thus processed maximum brightness image and composite image are respectively displayed on the monitor televisions 20 and 21 through the maximum brightness image display circuit 8 and the composite image display circuit 9 and also these images can be transferred to the higher-rank computer through the image data transfer circuit 10.

Figure 6:
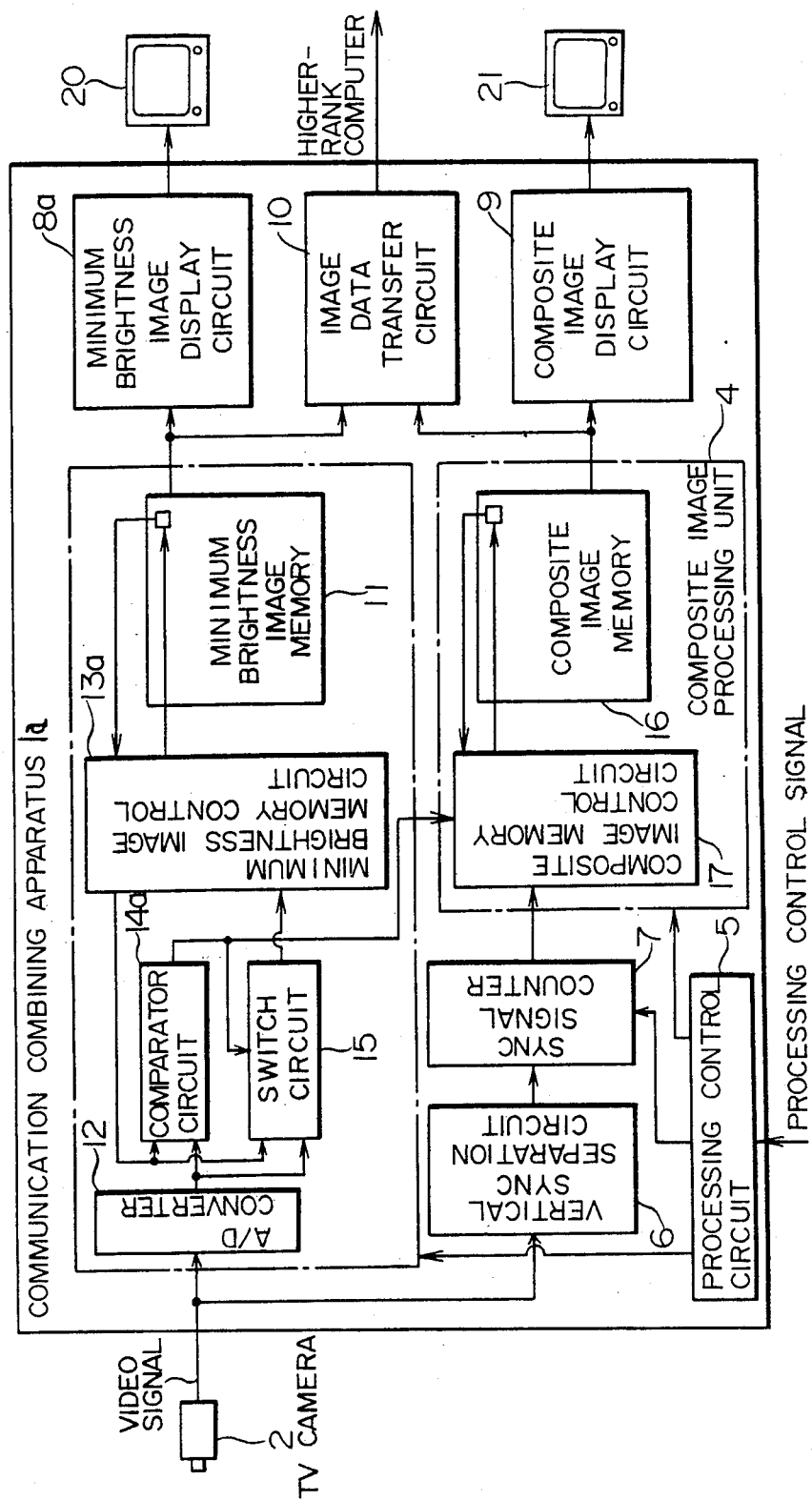
FIG. 6 is a block diagram showing the construction of an image composing apparatus according to another embodiment of the invention.

FIG. 6 is a block diagram showing the construction of an image composing apparatus according to another embodiment of the invention and this embodiment shows a case in which the count of synchronizing signals is written into the corresponding picture element at the timing of minimum brightness at which each of the picture elements of a video signal assumes the minimum value.

Figure 1:
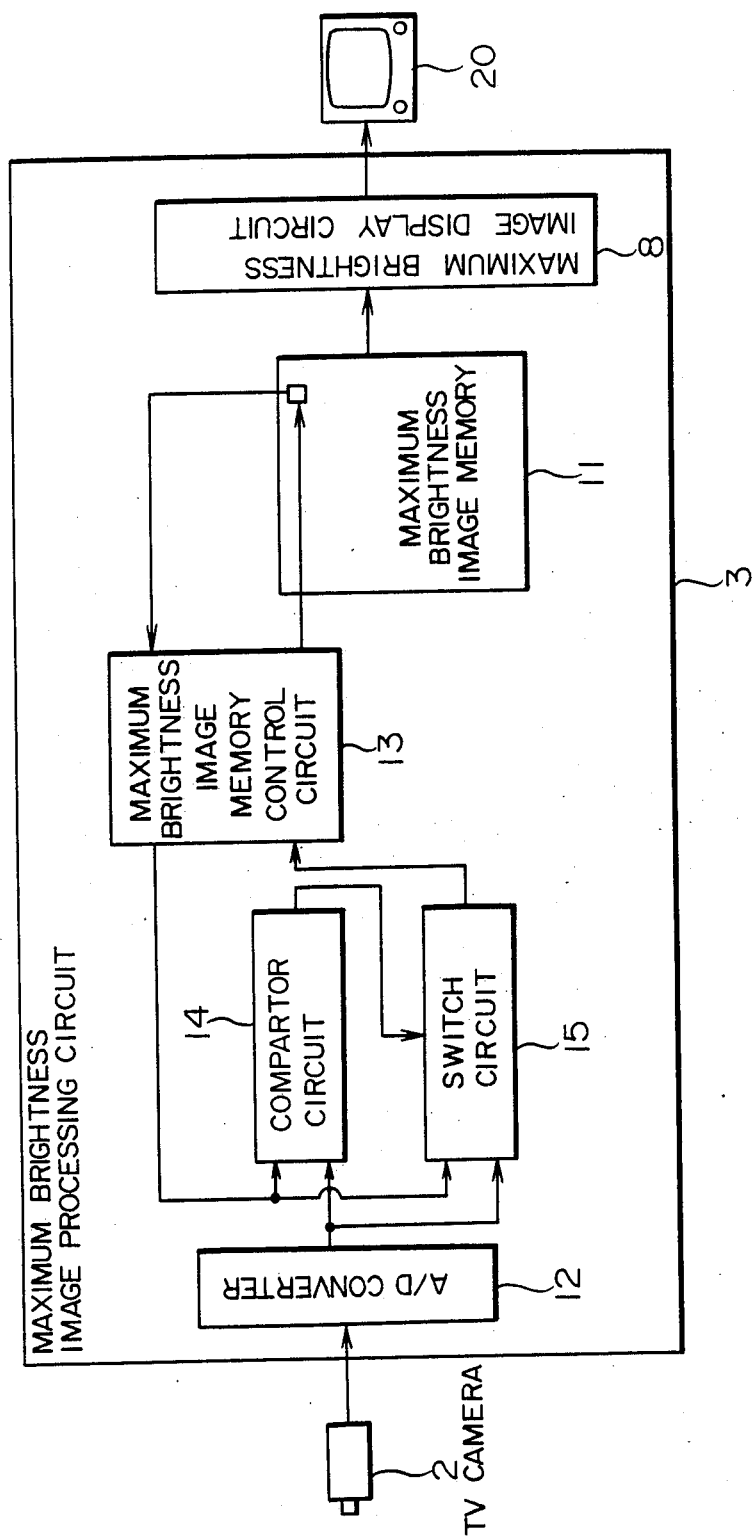
FIG. 1 is a block diagram showing the construction of a conventional maximum brightness image processing circuit.
Figure 2:
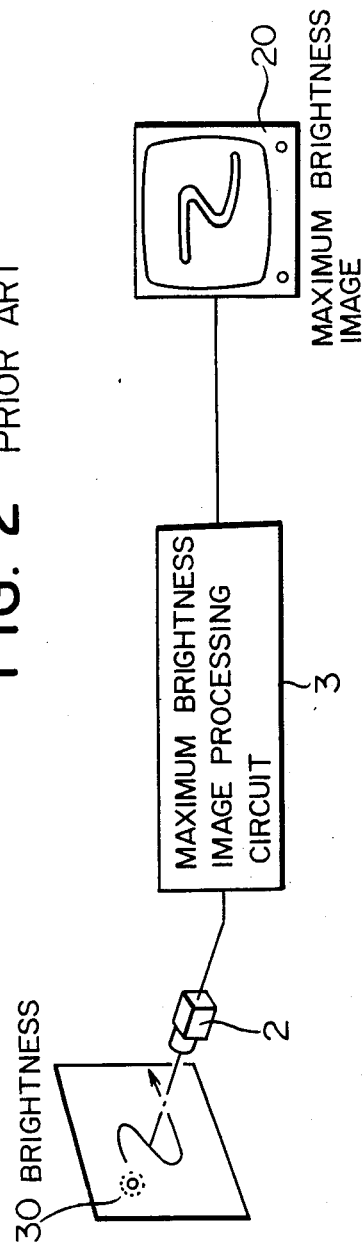
FIG. 2 is a schematic diagram showing an example of the application of a conventional maximum brightness image processing circuit.
Figure 3:
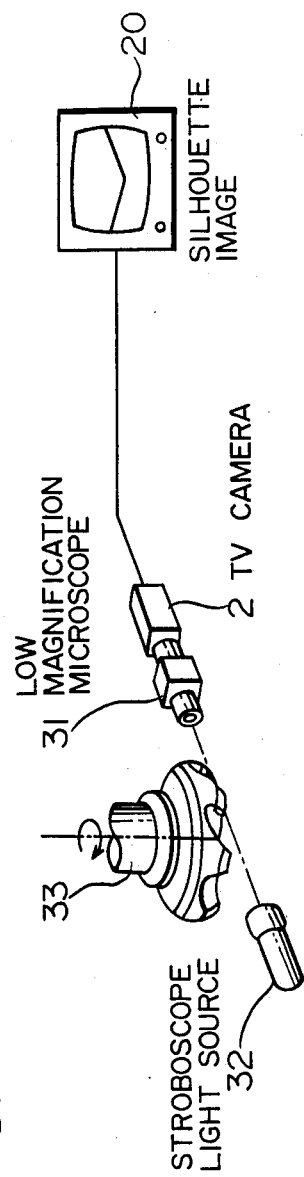
FIGS. 3 and 4 are schematic diagrams showing an example of the application of a conventional minimum brightness image processing circuit.
Figure 4:
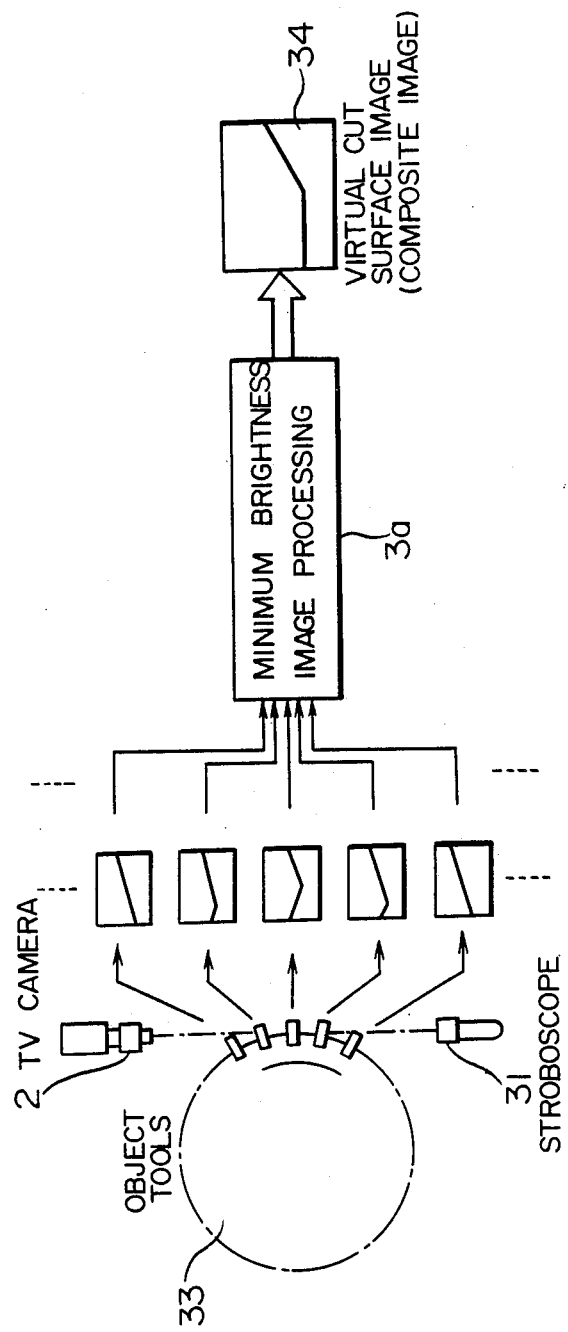

An image composing apparatus 1a of this embodiment differs from the image composing apparatus 1 of FIG. 1 in that the maximum brightness image processing unit 3 is replaced by a minimum brightness image processing unit 3a which includes a minimum brightness image memory 11a in placement of the maximum brightness image memory 11 and a minimum brightness image memory control circuit 13a in place of the maximum brightness memory control circuit 13, and that the comparator circuit 14 is replaced by a comparator circuit 14a which generates an output when the video signal level is smaller than the value of the corresponding picture element in a minimum brightness image memory 11a. Also, the maximum brightness image display circuit 8 is replaced by a minimum brightness image display circuit 8a and the remaining construction is the same with the apparatus of FIG. 1.

The image composing apparatus 1a is basically the same in operation with the apparatus of FIG. 1. Thus, when the comparator circuit 14a compares the signal level of the video signal with that of the corresponding picture element in the minimum brightness image memory 11a so that the signal level of the video signal is smaller, the signal level value is written into the corresponding picture element of the minimum brightness image memory 11a to update its value and simultaneously the then current count of synchronizing signals is written into the corresponding picture element of the composite image memory 16.

In this way, minimum brightness image data and composite image data are successively stored in the minimum brightness image memory 11a and the composite image memory 16, respectively.

While the above-described embodiments show the cases where the counts of synchronizing signals are written into the composite image memory 16, it is possible to form a composite image by writing external input signals such as externally applied timing, position or angle signals in place of the counts of synchronizing signals and in this case such external input signals are applied to the composite image memory control circuit 17.

Figure 7:
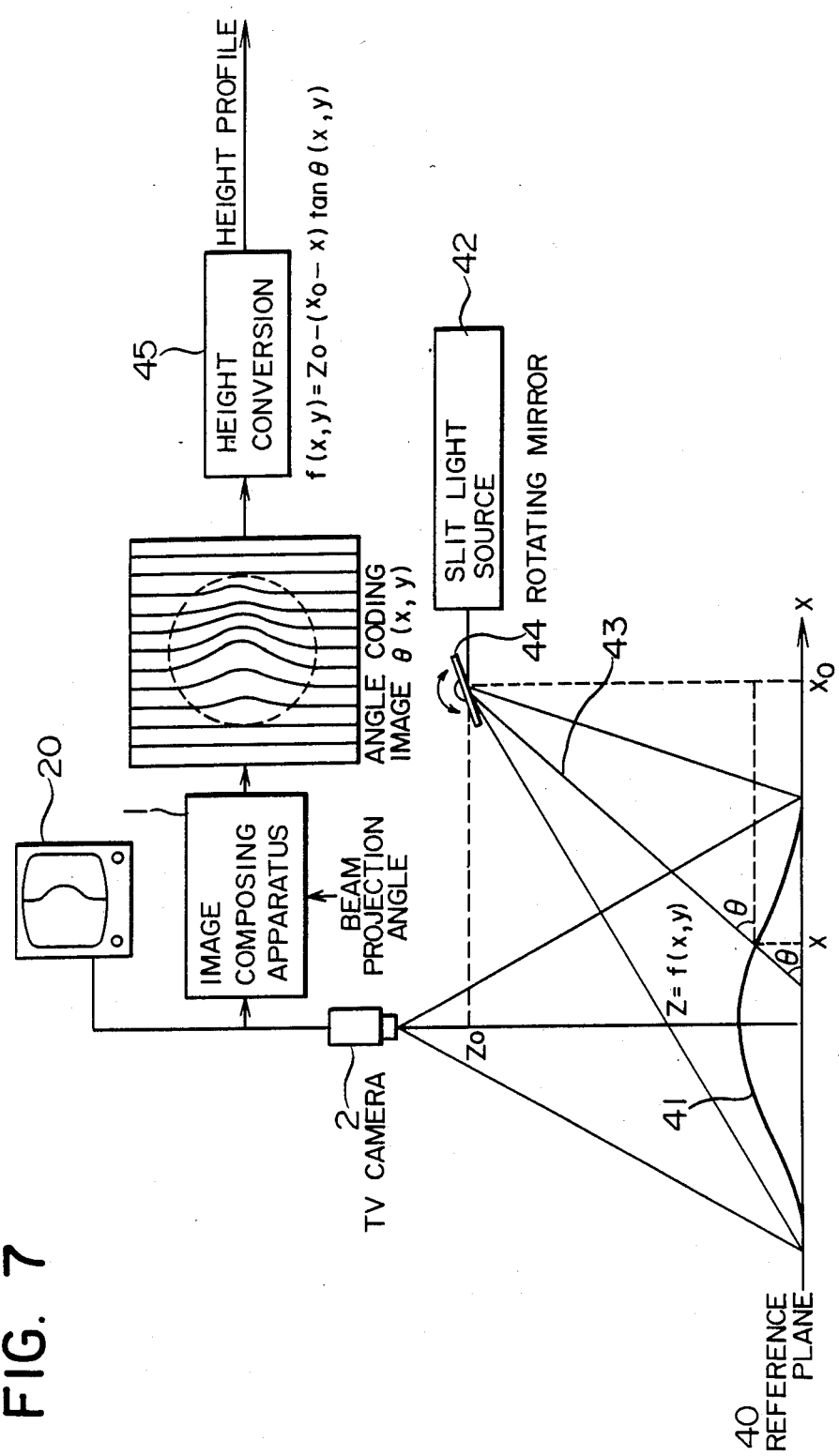
FIG. 7 is a schematic diagram showing an example of the application of the image composing apparatus of the invention to a three-dimensional shape measuring apparatus.

Referring to FIG. 7, there is illustrated a schematic diagram showing an example in which the invention is applied to a three-dimensional curved surface shape measuring apparatus.

With this three-dimensional free curved surface shape measuring apparatus, a slit light 43 spreading vertically to the plane of the paper is obliquely projected from a slit light source 42 onto the surface of an object 41 to be measured which is placed on a reference place 40, and the object 2 is picked up from just above by a television camera 2 while moving the slit light 43 traversely to the plane of the paper by means of a rotating mirror 44. At this time, the manner in which the linear reflected pattern of the slit light is moved traversly to the image on the object surface is observed on a monitor television 20.

In this apparatus, an image composing apparatus 1 of this invention receives the video signal generated from the television camera 2 which picks up the manner in which the linear reflected pattern of the slit light 43 is moved over the object surface and also external input signals or slit light projection angles $\theta$ computed from the angles of the rotary mirror 44 are received, thereby forming n image in which the value of each of the picture elements in the image is represented by the projection angle $\theta$ of the slit light at the instant that the slit light passes through the position on the object surface corresponding to that picture element.

The composite image formed in this way is such that the value of each of the picture elements corresponds to the angle of elevation obtained when the center of the slit light rotation of the rotating mirror 44 is looked up from the position on the object surface corresponding to that picture element.

Therefore, if the composite image is represented in terms of $\theta(x, y)$ by using the coordinate system (x, y) of the corresponding object surface, the profile $f(x, y)$ of the object surface can he obtained in the form of the following equation by a simple geometrical calculation based on FIG. 7 and performed by a height conversion circuit 45.

$$f(x, y) = z_0 - (x_0 - x)\tan \theta(x, y) \qquad (1)$$

Here, $x_0$ represents the horizontal displacement of the axis of slit light rotation with respect to the reference plane 40, and $z_0$ similarly represents the vertical displacement.

In this way, by using the image composing apparatus of the present invention, it is possible to realize a convenient three-dimensional free curved surface shape measuring apparatus which has never been made in the past and the effectiveness of this invention can also be seen from this fact.

What is claimed is:

1. An image composing apparatus comprising:
    Image composing means whereby external input signals are inputted and simultaneously a video signal inputted from a television camera is processed from moment to moment for a predetermined period of time to form a composite image in which a value of each of picture elements is represented by a value of corresponding one of said external input signals at an instant that a level of said video signal becomes highest or lowest during said predetermined period of time.

2. An image composing apparatus according to claim 1, further comprising synchronizing signal counting means for counting vertical synchronizing signals of said video signal inputted from said television camera or frequency-divided signals thereof to supply count outputs of said synchronizing signal counting means as said external input signals to said image composing means.

3. An image composing apparatus according to claim 1, wherein timing signals are inputted as said external input signals.

4. An image composing apparatus according to claim 1, wherein position signals are inputted as said external input signals.

5. An image composing means according to claim 1, wherein angle signals are inputted as said external input signals.

6. An image composing apparatus according to claim 1, wherein said image composing means comprises:
    maximum brightness image memory means for storing a maximum level of said video signal for each of picture elements thereof within said predetermined period of time;
    maximum brightness image processing means for comparing said video signal and a signal stored in said maximum brightness image memory means with respect to each corresponding picture elements thereof to write greater-valued one thereof into said maximum brightness image memory means;

composite image memory means for storing for each of said picture elements a count value of synchronizing signals or a value of one of said external input signals at an instant that said video signal attains the highest level during said predetermined period of time; and composite image processing means whereby for each said picture element for which said maximum brightness image processing means determines that said video signal is greater than said signal stored in said maximum brightness image memory means, a count value of synchronizing signals or a value of one of said external input signals at the instant of said determination is written into said composite image memory means.

7. An image composing apparatus according to claim 1, wherein said image composing means comprises:

minimum brightness image memory means for storing a minimum level of said video signal for each of picture elements thereof within said predetermined period of time;

minimum brightness image processing means for comparing said video signal and a signal stored in said minimum brightness image memory means with respect to each corresponding picture elements thereof to write smaller-valued one thereof into said minimum brightness image memory means;

composite image memory means for storing for each of said picture elements a count value of synchronizing signals or a value of one of said external input signals at an instant that said video signal attains the minimum level during said period of time; and composite image processing means whereby for each said picture element for which said minimum brightness image processing means determines that said video signal is smaller than said signal stored in said minimum brightness image memory means, a count value of synchronizing signals or a value of one of said external input signals at the instant of said determination is written into said composite image memory means.

* * * * *